May 19, 1970  TORAHIKO HAYASHI  3,513,477
APPARATUS FOR MEASURING AND FEEDING FOOD DRESSING MATERIAL
Filed July 8, 1969  2 Sheets-Sheet 1

INVENTOR.
TORAHIKO HAYASHI
BY Kenwood Ross &
Chester E. Flavin
ATTORNEYS.

3,513,477
APPARATUS FOR MEASURING AND FEEDING FOOD DRESSING MATERIAL

Torahiko Hayashi, 2–3 Nozawa-cho,
Utsunomiya-shi, Tochigi-ken, Japan
Continuation-in-part of application Ser. No. 732,807,
May 27, 1968. This application July 8, 1969, Ser.
No. 839,898
Int. Cl. F04c *3/00, 23/00;* F04b *13/00*
U.S. Cl. 418—208    2 Claims

ABSTRACT OF THE DISCLOSURE

Apparatus for measuring and feeding viscous materials adapted for measuring materials inconsistent in viscosity or elasticity or collapsible property as cake materials of bean paste, cream and jam, and also minced meat and vegetables or a mixture thereof in a predetermined amount and at a uniform flow speed. The apparatus consists of two shafts placed one on each side of a discharge pipe and provided with a number of arbitrarily arranged slots, vanes inserted into the slots so that each vane can slide freely along its respective slot, a case within which the shafts and the vanes are housed so that the two shafts are parallel and can be made to rotate in opposite directions at the same speed, and a swinging cam placed between the shafts so that the cam comes in dynamic contact with the vanes and causes each vane to recede as far as the circumference of its respective shaft just before the vane reaches the discharge pipe, so that the material within the case is continuously and simultaneously measured and delivered.

CROSS-REFERENCE TO RELATED APPLICATION

A continuation-in-part of Ser. No. 732,807 filed May 27, 1968.

BACKGROUND OF THE INVENTION

Field of the invention

Among all the processes involved in a molding operation, the first step to occur is that of working the raw material into a specified shape and continuously supplying it at a uniform speed. This must be done with great precision, for the efficiency of the entire factory may be decisively influenced by whether this process is smooth or not.

The invention is concerned, not with solid raw materials such as metals and wood, but rather, in general, with materials having plasticity, and especially with viscous materials.

The invention provides a smooth and precise supply process for such materials, not only with respect to viscous chemical compounds having uniform properties but also with respect to viscous mixtures such as cooking materials.

Description of the prior art

To compare the present invention with past technology, the degree of hardness of a viscous material has had, in the past, an extremely great influence on the difficulty or ease of operation, so that the delivery at a uniform speed of a viscous material having hardly any fluidity has been extremely difficult and sometimes impossible.

Moreover, such delivery has been entirely impossible in the case of a material whose viscosity, elasticity or plasticity is not uniform. For example, cooking materials, such as mincemeat, jam containing chunks of fruit, boiled minced vegetables, and the like are, viewed macroscopically, viscous materials; but, since the response of such a material to stress is not uniform throughout the material, a screw device cannot deliver it continuously at a precisely determined uniform speed. On the other hand, a device which is designed to supply such a material while simultaneously measuring it in a measuring container requires, in the case of a material lacking in fluidity, a mechanism for the purpose of forcing the material into the measuring container; but, since the only mechanisms available in the past for such a purpose have been mechanisms employing a reciprocating movement, it has been impossible to preserve a precise and constant speed for the discharge of material through a discharge pipe of a specified shape.

SUMMARY OF THE INVENTION

This invention makes possible what has hitherto been impossible, namely the delivery at a constant speed of a material whose viscosity, elasticity or plasticity is not uniform.

Moreover, the mechanism achieves this object without strongly compressing the material, and has the advantage of not causing deterioration in the taste or quality of cooking materials.

When a device embodying this invention was used experimentally to deliver at a constant speed a material consisting of a mixture of cream and boiled white potatoes, the form of the boiled white potatoes was changed hardly at all from its former condition.

Such an apparatus which can simultaneously measure and deliver a raw material without imparting any change to its quality will be extremely useful in the manufacturing operations of foodstuff factories.

DESCRIPTION OF THE PREFERRED EMBODIMENT

Two parallel screws 1 have helices which are oppositely disposed and rotate in opposite directions at the same speed so that the edges of the helices are always in alignment. Two shafts 2 are attached to the forward ends of screws 1 and are provided with two pairs each of equally spaced radial slots 3. Four vanes 4 which are inserted into slots 3 of shafts 2.

Figure 1:
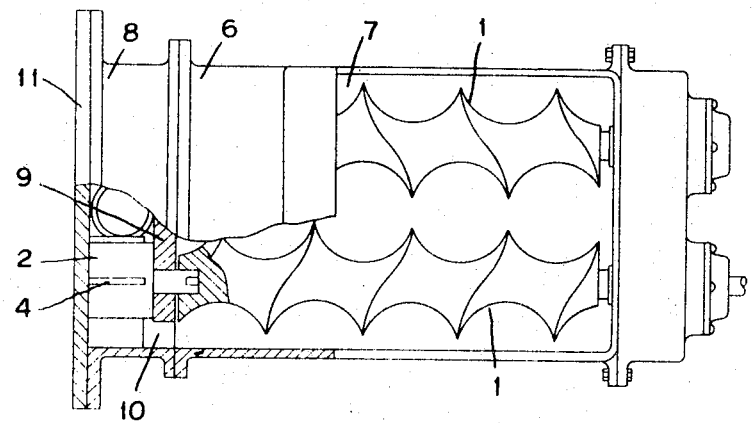
FIG. 1 is a plan view, partly in section of an apparatus according to the invention.
Figure 2:
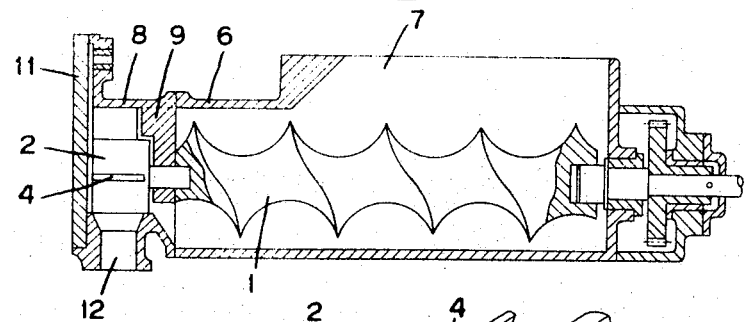
FIG. 2 is a view in longitudinal section of the FIG. 1 apparatus.
Figure 6:
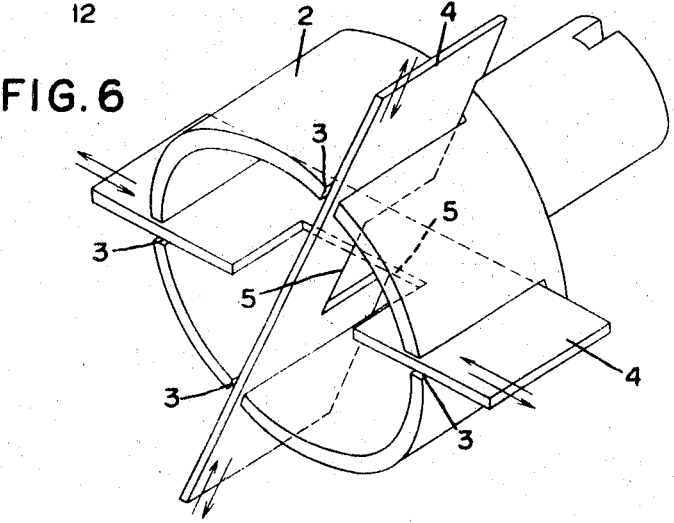
FIG. 6 is a perspective view of a shaft showing the mounting of the vanes.

As shown in FIG. 6, vanes 4 are provided with recesses 5 around the place where they cross, so that they can slide freely within slots 3 without interfering with each other. A housing 6 is provided in which screws 1 are arranged in parallel. 7 indicates an inlet, through which material is fed into housing 6. 8 indicates a case, in which shafts 2, with vanes 4 inserted, are arranged in parallel. Shafts 2, being continuations of the shafts of screws 1, are thus made to rotate in opposite directions at the same speed.

The rear of case 8 is firmly attached to the front of housing 6 and consists of a partition 9 and two inflow openings 10. The front of case 8 is entirely closed with a cover 11.

A discharge outlet 12 is located between shafts 2. 13 indicates a cam made of thin plate and fitted onto a pivot 14 so a to swing from side to side. In order that its swinging movement does not obstruct discharge outlet 12, cam 13 is located at the front of case 8, next to cover 11.

Cam 13 is housed in a chamber 15, which is of the minimum size necessary to contain the movement of cam 13.

Material fed into housing 6 through inlet 7 is transferred by the rotation of screws 1 through inflow openings 10 into case 8. Since shafts 2 are engaged with the shafts of screws 1, and since vanes 4 are inserted into shafts 2, vanes 4 rotate together with screws 1. The material is advanced by means of vanes 4 in the direction of their rotation, i.e. in the directions of the thin arrows in FIGS. 3 through 5. When the material reaches the part of case 8 adjacent to partition 9, it becomes confined in a compartment which is enclosed on all six sides, viz.: before and behind the direction of advance of the material, by vanes 4; on either side, by partition 9 and cover 11; and above and below, by the inside of case 8 and the outer surface of a shaft 2. This compartment constitutes the measuring container.

If, as in the illustrated embodiment, the device is constructed with two blades 4 inserted perpendicularly to each other into each shaft 2, each side of case 8 will be divided into four delivery portions, of which the delivery portion adjacent to partition 9 will constitute the measuring container. Consequently, in the present embodiment, partition 9 must extend over an arc of 90° or more in order that the measuring compartment be completely air-tight. By this means, it becomes possible to measure with precision the material being delivered.

Figure 3:
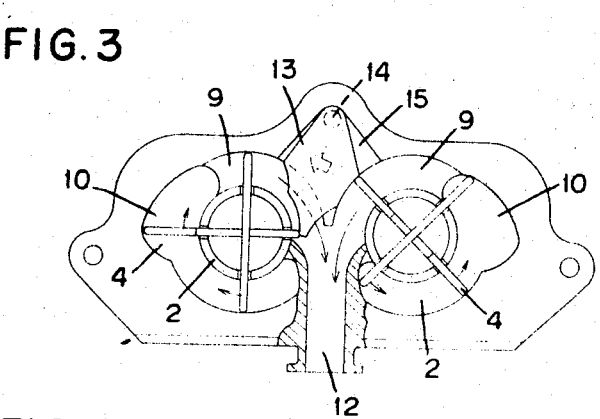
FIGS. 3 to 5 are front views showing the measuring and delivering operation.
Figure 4:
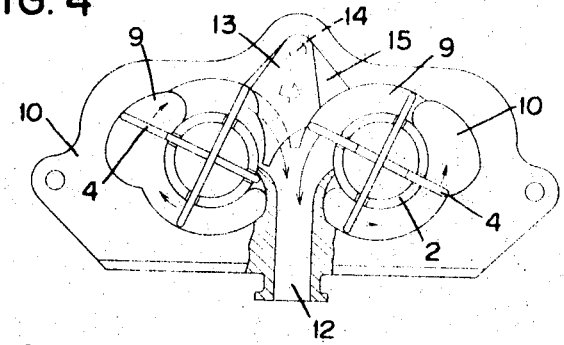
Figure 5:
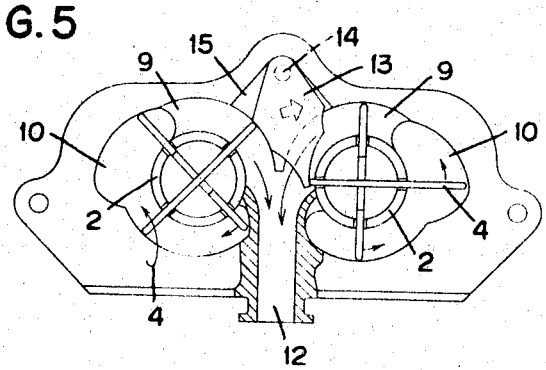

The rapid and precise recessive movement of a vane 4, when it approaches the opening of discharge outlet 12, is illustrated sequentially in FIGS. 3 through 5. Since the two parallel shafts 2 rotate in such a manner that their vanes 4 never interfere with each other (more precisely, since each shaft 2 is 45° out of phase with the mirror image of the other shaft 2), cam 13 is always in dynamic contact with two vanes 4, one from each shaft 2. Just an instant before a vane 4 reaches discharge outlet 12, the swinging movement of cam 13 causes the leading edge of said vane 4 to recede as far as the circumference of its shaft 2, as shown in FIG. 5. The arrow in FIG. 5 shows the direction in which cam 13 is forced to swing by a vane 4 on the other shaft 2. The swinging movement of cam 13 shown in FIG. 5 is accompanied by the emergence of this latter vane 4 from its shaft 2. As the above process is repeated, the two measuring compartments on the right and on the left alternatingly discharge the material with which they are filled. The speed of discharge is constant and is always proportional to the rotation of shafts 2.

In the illustrated embodiment, there are two vanes 4 per shaft 2, or a total of four vanes 4. The number of vanes 4 may be increased, however, as long as the number on the right and on the left is the same. There is no particular limit on the number of vanes 4 which may be used; functionally speaking, the more the better.

As described, the invention consists of a swinging cam 13 and of vanes 4 inserted in pairs of slots 3 spaced evenly around the circumference of shafts 2 so that vanes 4 can slide within slots 3, and makes it possible automatically and smoothly to deliver at an even speed a viscous material as defined above while at the same time accurately measuring it.

To summarize, the invention consists of vanes 4 for advancing the material, which vanes 4 are constructed so that they project through the middle of their respective shafts 2 and slide freely within their respective slots 3; and a cam 13, which swings from side to side while remaining in dynamic contact with vanes 4 so as to cause said vanes 4 to recede and emerge as desired.

Thus it can be appreciated that what is envisioned here is a constant speed delivery device for delivering a material continuously at a specified speed through a discharge pipe of a specified shape while simultaneously measuring its volume by means of measuring containers. The two sets of vanes are inserted into parallel shafts rotating in opposite directions and are set within a case so that the vanes divide the case into enclosures for the purpose of measurement. The cam rapidly pushes each vane as far as the circumference of its respective shaft when the vane approaches the discharge pipe.

Each vane, as it makes one full revolution, serves the three consecutive functions of ranking in the material, measuring a uniform amount of material, and discharging the material.

The recessive movement of the vane, which must occur at the end of the discharge function before the next revolution can begin, is accomplished by the cam. Since this recessive movement is very fast and since there are no dynamic problems or obstructions, each revolution of a vane is extremely effective.

The cam is not a fixed object, nor is it made to turn by an independent power source.

The cam is fitted onto a pivot so as to swing from side to side. This swinging motion begins when a vane on one side of the cam comes in contact with the cam. The contact causes the cam to swing away from the vane. As it swings, the cam pushes from an effective angle against another vane located on the opposite side of the cam, causing the other vane to recede rapidly into its slot in its respective shaft.

Since the entire device is constructed extremely simply from a small number of parts, it can easily be disassembled for cleaning. This feature is extremely practical when food materials are being delivered.

Whenever it is desired to deliver, at a precise and constant speed through a discharge pipe of a specified shape, a viscous material having little fluidity, the invention may be attached to the discharge port of a screw mechanism or, alternatively, to the lower opening of a funnel and will serve the purpose of regularizing the uneven material discharge from the screw mechanism or the funnel. Furthermore, the invention can be used with respect to liquids in general as an efficient pump with little back-flow.

The invention is also extremely appropriate for materials, such as food materials, which must not be subjected to great pressure.

I claim:

1. A device for delivering viscous materials at constant speed, consisting of two shafts placed one on each side of a discharge pipe and provided with a number of arbitrarily arranged slots, vanes inserted into the slots so that each vane can slide freely along its respective slot, a case within which the shafts and the vanes are housed so that the two shafts are parallel and can be made to rotate in opposite directions at the same speed, and a swinging cam placed between the shafts so that the cam comes in dynamic contact with the vanes and causes each vane to recede as far as the circumference of its respective shaft just before said vane reaches the discharge pipe, so that the material within the case is continuously and simultaneously measured and delivered.

2. A device as described in claim 1, characterized by the fact that a portion of the path swept by the vanes as they rotate is enclosed by partitions so as to constitute a measuring container.

References Cited

UNITED STATES PATENTS

| | | | |
|---|---|---|---|
| Re. 1,148 | 3/1861 | Kinman | 222—17 |
| 2,977,039 | 3/1961 | Green et al. | 230—158 X |
| 3,132,847 | 5/1964 | Mercuriali | 103—7 X |
| 3,159,315 | 12/1964 | Friesen | 222—252 |
| 3,183,838 | 5/1965 | Englesson | 103—4 |
| 3,260,210 | 7/1966 | Gram | 103—138 X |
| 3,306,228 | 2/1967 | Drutchas | 103—136 X |

WILLIAM L. FREEH, Primary Examiner

W. J. KRAUSS, Assistant Examiner

U.S. Cl. X.R.

222—412; 418—15